(12) United States Patent
Tall et al.

(10) Patent No.: US 10,760,446 B2
(45) Date of Patent: Sep. 1, 2020

(54) ADDITIVELY MANUFACTURED AIRFLOW MASK TOOL

(71) Applicant: United Technologies Corporation, Farmington, CT (US)

(72) Inventors: Mary Lynn Tall, Rocky Hill, CT (US); John D. Laggis, III, Manchester, CT (US); Natalie Jean DiStefano, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 280 days.

(21) Appl. No.: 15/892,793

(22) Filed: Feb. 9, 2018

(65) Prior Publication Data

US 2019/0249564 A1    Aug. 15, 2019

(51) Int. Cl.

| | |
|---|---|
| *F01D 21/00* | (2006.01) |
| *B23P 15/02* | (2006.01) |
| *B33Y 80/00* | (2015.01) |
| *G01M 15/14* | (2006.01) |
| *F01D 25/28* | (2006.01) |

(Continued)

(52) U.S. Cl.
CPC ............ *F01D 21/003* (2013.01); *B23P 15/02* (2013.01); *B33Y 80/00* (2014.12); *F01D 25/285* (2013.01); *G01M 15/14* (2013.01); *B22F 3/1055* (2013.01); *B22F 5/10* (2013.01); *B22F 2005/002* (2013.01); *B23P 2700/06* (2013.01); *F05D 2230/22* (2013.01); *F05D 2240/11* (2013.01); *F05D 2240/30* (2013.01); *F05D 2240/35* (2013.01); *F05D 2260/20* (2013.01); *F05D 2260/83* (2013.01); *G01F 1/00* (2013.01)

(58) Field of Classification Search
CPC .......... F01D 21/003; F01D 21/00; F01D 5/00; F01D 5/30; F01D 25/28; F05D 2260/83; F05D 2260/20; F05D 2240/35; F05D 2240/30; F05D 2240/11; G01F 1/00; B23P 15/02; G01L 19/00; B23Q 3/06; B23Q 3/08
See application file for complete search history.

(56) References Cited

U.S. PATENT DOCUMENTS

| | | |
|---|---|---|
| 4,822,013 A | 4/1989 | Johnson |
| 5,726,348 A | 3/1998 | Draghi et al. |

(Continued)

FOREIGN PATENT DOCUMENTS

| | | |
|---|---|---|
| EP | 0816635 A2 | 1/1998 |
| EP | 1582838 A1 | 10/2005 |

(Continued)

OTHER PUBLICATIONS

European Search Report dated Jun. 13, 2019 for corresponding European Patent Application No. 19156534.0.

*Primary Examiner* — Brandi N Hopkins
(74) *Attorney, Agent, or Firm* — Bachman & LaPointe, P.C.

(57) ABSTRACT

An airflow mask tool incudes a pressure side mask portion to seal at least a portion of a pressure side of a component having an array of internal passageways and a suction side mask portion to seal at least a portion of a suction side of the component, at least one of the suction side mask portion and the pressure side mask portion comprising at least one opening to expose at least one exit from the array of internal passageways.

22 Claims, 9 Drawing Sheets

(51) Int. Cl.
   *G01F 1/00*     (2006.01)
   *B22F 3/105*    (2006.01)
   *B22F 5/10*     (2006.01)
   *B22F 5/00*     (2006.01)

(56) References Cited

U.S. PATENT DOCUMENTS

| | | |
|---|---|---|
| 6,224,361 B1 * | 5/2001 | Reed .................. B23K 26/18 |
| | | 264/267 |
| 6,571,484 B2 | 6/2003 | Hastilow |
| 7,024,787 B2 | 4/2006 | Varsell et al. |
| 7,685,870 B2 | 3/2010 | Quinn et al. |
| 7,971,473 B1 | 7/2011 | Meunier et al. |
| 8,534,122 B2 | 9/2013 | Mironets et al. |
| 8,764,000 B2 | 7/2014 | Fisk |
| 9,957,842 B2 | 5/2018 | Lowth et al. |
| 2009/0000453 A1 * | 1/2009 | Fisk .................. B23P 15/02 |
| | | 83/745 |
| 2012/0171045 A1 * | 7/2012 | Spangler ............ B05B 12/24 |
| | | 416/241 R |
| 2016/0332382 A1 | 11/2016 | Coward et al. |

FOREIGN PATENT DOCUMENTS

| | | |
|---|---|---|
| EP | 2008759 A1 | 12/2008 |
| EP | 2865847 A1 | 4/2015 |
| FR | 26080871 A1 | 6/1988 |
| GB | 2358829 A | 8/2001 |
| WO | 2015107333 A1 | 7/2015 |

\* cited by examiner

ADDITIVELY MANUFACTURED AIRFLOW MASK TOOL

BACKGROUND

The present disclosure relates to an additively manufactured airflow mask, and more particularly, to an airflow mask for a component having an array of internal passageways to test airflow therethrough.

Gas turbine engines, such as those that power modern commercial and military aircraft, generally include a compressor section to pressurize an airflow, a combustor section to burn hydrocarbon fuel in the presence of the pressurized air, and a turbine section to extract energy from the resultant combustion gases.

Gas path components, such as turbine blades and vanes, often include an array of internal cooling passageways to provide cooling such as external film cooling, internal air impingement, and forced convection, either separately, or in combination. The flow paths of the array of internal passageways are typically sampled and tested during production. In some tests, the airflow is tested while exits are drilled, known as in-process, to confirm that the hole drill process is within specification. The airflow requirements, may be average airflows between in-process and final airflow. Due to the complexity of the array of internal cooling passageways, and the number of flow paths thereof, external masking is typically utilized during testing to mask particular flow paths of the array of internal cooling passageways.

Currently a manual masking method is utilized to mask particular exits of the array of internal cooling passageways. A removable material such as wax is used to block exits which are not a part of the flow path which is to be tested. This wax then needs to be washed or burned out to then proceed to the next airflow test. The time required for this masking and removing of masking takes, on average, 30-60 minutes per flow path. The increasing complexity of components currently in development will only increase the time required for masking.

SUMMARY

An airflow mask tool according to one disclosed non-limiting embodiment of the present disclosure includes a pressure side mask portion to seal at least a portion of a pressure side of a component having an array of internal passageways; and a suction side mask portion to seal at least a portion of a suction side of the component, at least one of the suction side mask portion and the pressure side mask portion comprising at least one opening to expose at least one exit from the array of internal passageways.

A further aspect of the present disclosure includes that the pressure side mask portion fits to the suction side mask portion to enclose at least a portion of the component.

A further aspect of the present disclosure includes that the pressure side mask portion is keyed to the suction side mask portion via a multiple of apertures and corresponding multiple of studs.

A further aspect of the present disclosure includes that the pressure side mask portion fits to the suction side mask portion to enclose an airfoil of the component.

A further aspect of the present disclosure includes that the pressure side mask portion fits to the suction side mask portion to enclose an airfoil and a portion of a platform of the component.

A further aspect of the present disclosure includes that the pressure side mask portion and the suction side mask portion respectively comprise a seal surface and a support structure, the seal surface to seal component.

A further aspect of the present disclosure includes that the seal surface is manufactured of a softer material than the support structure.

A further aspect of the present disclosure includes that the seal surface is of a Shore 10A-50A on the ASTM D2240 type A durometer scale.

A further aspect of the present disclosure includes that the seal surface of the pressure side mask portion comprises an at least partially arcuate convex portion that is formed to correspond with a sidewall of an airfoil of the component.

A further aspect of the present disclosure includes that a leading edge of the partially arcuate convex portion is displaced from an interface surface that interfaces with an interface surface of the suction side mask portion.

A further aspect of the present disclosure includes that the seal surface of the suction side mask portion comprises an at least partially arcuate concave portion that is formed to correspond with a sidewall of the airfoil.

A further aspect of the present disclosure includes that the seal surface of the suction side mask portion comprises a leading edge section that at least partially wraps around a leading edge of the airfoil.

A further aspect of the present disclosure includes that a leading edge portion of the support structure extends to support the seal surface of the leading edge section.

A further aspect of the present disclosure includes that the at least one opening to expose the at least one exit from the array of internal passageways is located adjacent to the leading edge of the airfoil.

A further aspect of the present disclosure includes that the at least one opening to expose the at least one exit from the array of internal passageways is located on a suction side of the airfoil.

A further aspect of the present disclosure includes that the pressure side mask portion and the suction side mask portion are additively manufactured.

A method of testing a portion of an array of internal passageways in a component according to one disclosed non-limiting embodiment of the present disclosure includes enclosing a component having an array of internal passageways within a pressure side mask portion and a suction side mask portion to expose at least one exit from the array of internal passageways; communicating airflow into the array of internal passageways such that the airflow exits through at least one exit from the array of internal passageways through one of the pressure side mask portion and the suction side mask portion; and nondestructively removing the pressure side mask portion and the suction side mask portion subsequent to communicating the airflow.

A further aspect of the present disclosure includes keying the pressure side mask portion to the suction side mask portion.

A further aspect of the present disclosure includes sealing the pressure side mask portion and the suction side mask portion to an airfoil of the component to seal all exits other than the at least one exit from the array of internal passageways.

A further aspect of the present disclosure includes sealing the pressure side mask portion and the suction side mask portion to an airfoil of the component to seal all exits other than the at least one exit from the array of internal passageways, the pressure side mask portion and the suction side mask portion additively manufactured.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
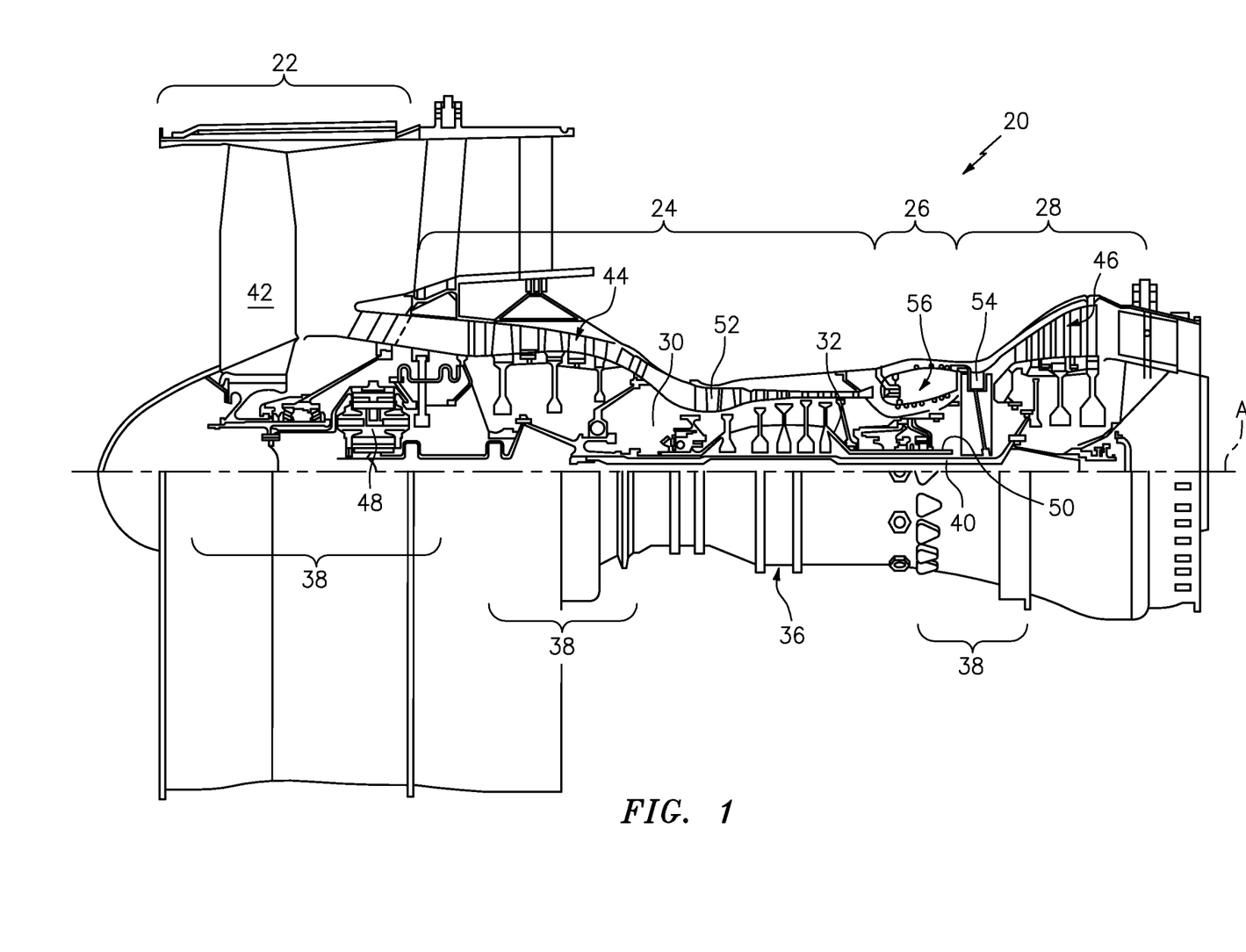
FIG. 1 is a schematic cross-section of an example gas turbine engine architecture.

FIG. 1 schematically illustrates a gas turbine engine 20. The gas turbine engine 20 as disclosed herein is a two spool turbofan that generally incorporates a fan section 22, a compressor section 24, a combustor section 26, and a turbine section 28. The fan section 22 drives air along a bypass flowpath while the compressor section 24 drives air along a core flowpath for compression and communication into the combustor section 26, then expansion through the turbine section 28. Although depicted as a high bypass gas turbofan engine architecture in the disclosed non-limiting embodiment, it should be appreciated that the concepts described herein are not limited only thereto.

The engine 20 generally includes a low spool 30 and a high spool 32 mounted for rotation around an engine central longitudinal axis A relative to an engine case structure 36 via several bearings 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system. The high spool 32 includes an outer shaft 50 that interconnects a high pressure compressor ("HPC") 52 and high pressure turbine ("HPT") 54. A combustor 56 is arranged between the HPC 52 and the HPT 54.

Figure 2:
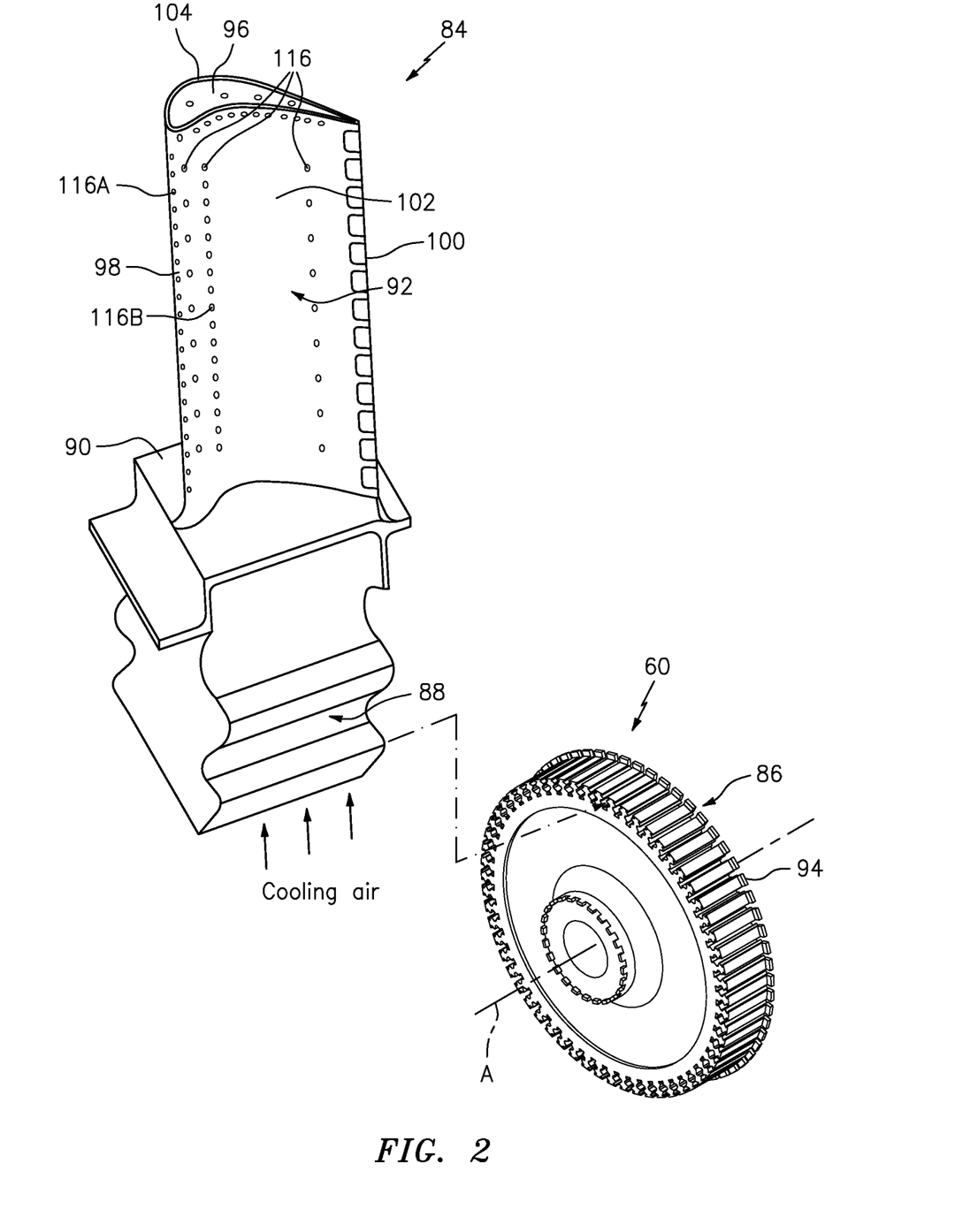
FIG. 2 is an exploded view of rotor assembly with an example component having an array of internal passageways.

With reference to FIG. 2, a rotor assembly 60 such as a turbine rotor assembly includes an array of blades 84 (one shown) circumferentially disposed around a disk 86. Each blade 84 includes a root 88, a platform 90 and an airfoil 92. The blade root 88 is received within a rim 94 of the disk 86 and the airfoil 92 extends therefrom.

The platform 90 separates a gas path side inclusive of the airfoil 92 and a non-gas path side inclusive of the root 88. The airfoil 92 defines a blade chord between a leading edge 98, which may include various forward and/or aft sweep configurations, and a trailing edge 100. A first sidewall 102 that may be convex to define a suction side, and a second sidewall 104 that may be concave to define a pressure side are joined at the leading edge 98 and at the axially spaced trailing edge 100. The tip 96 extends between the sidewalls 102, 104 opposite the platform 90.

Figure 3:
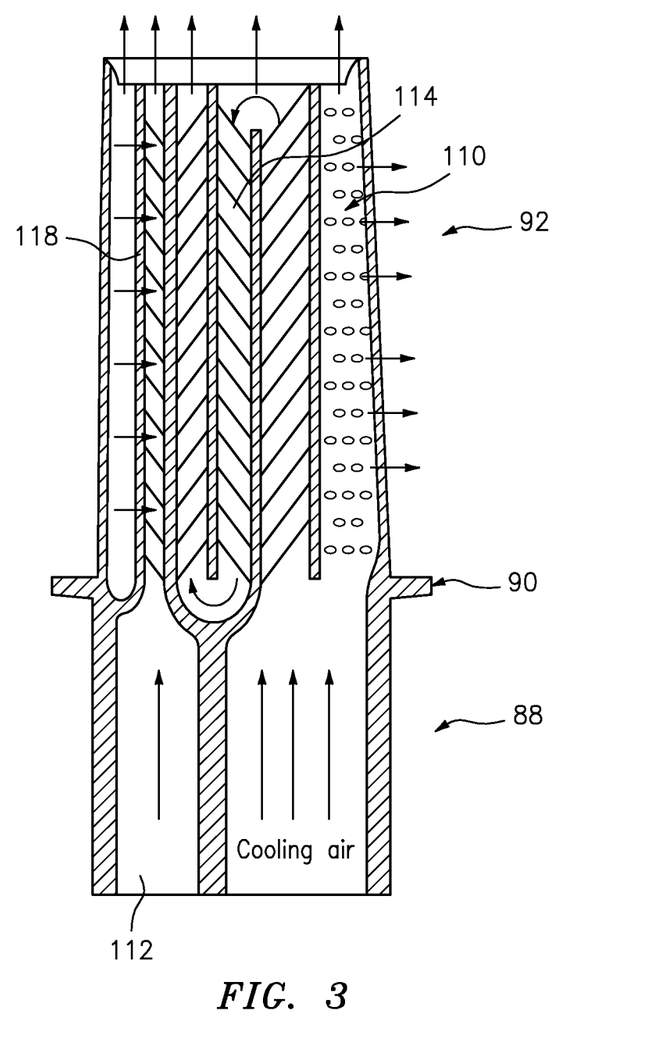
FIG. 3 is a cross-sectional illustration of the array of internal passageways.
Figure 4:
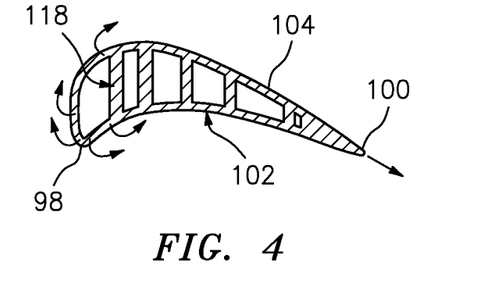
FIG. 4 is a lateral cross-sectional illustration of the array of internal passageways from the top of the component.

With reference to FIG. 3, to resist the high temperature stress environment in the gas path of a turbine engine, each blade 84 includes an array of internal passageways 110. The array of internal passageways 110 includes one or more feed passages 112 through the root 88 that communicates airflow into a multiple of cavities 114 (shown schematically) within the airfoil 92. The cavities 114 distribute the cooling flow through exits 116 in the sidewalls 102, 104, leading edge 98, and/or the trailing edge 100 (also shown in FIG. 4). Impingement passages 118 may also be located though internal walls between one or more of the cavities 114. It should be appreciated that various feed architectures, cavities, and passageway arrangements will benefit herefrom. Although a turbine blade will be used to illustrate the disclosed cooling passage testing method, other airflow cooled components such as blade outer air seals, combustor heat shields, and other combustor augmenter details will also benefit herefrom.

Figure 5:
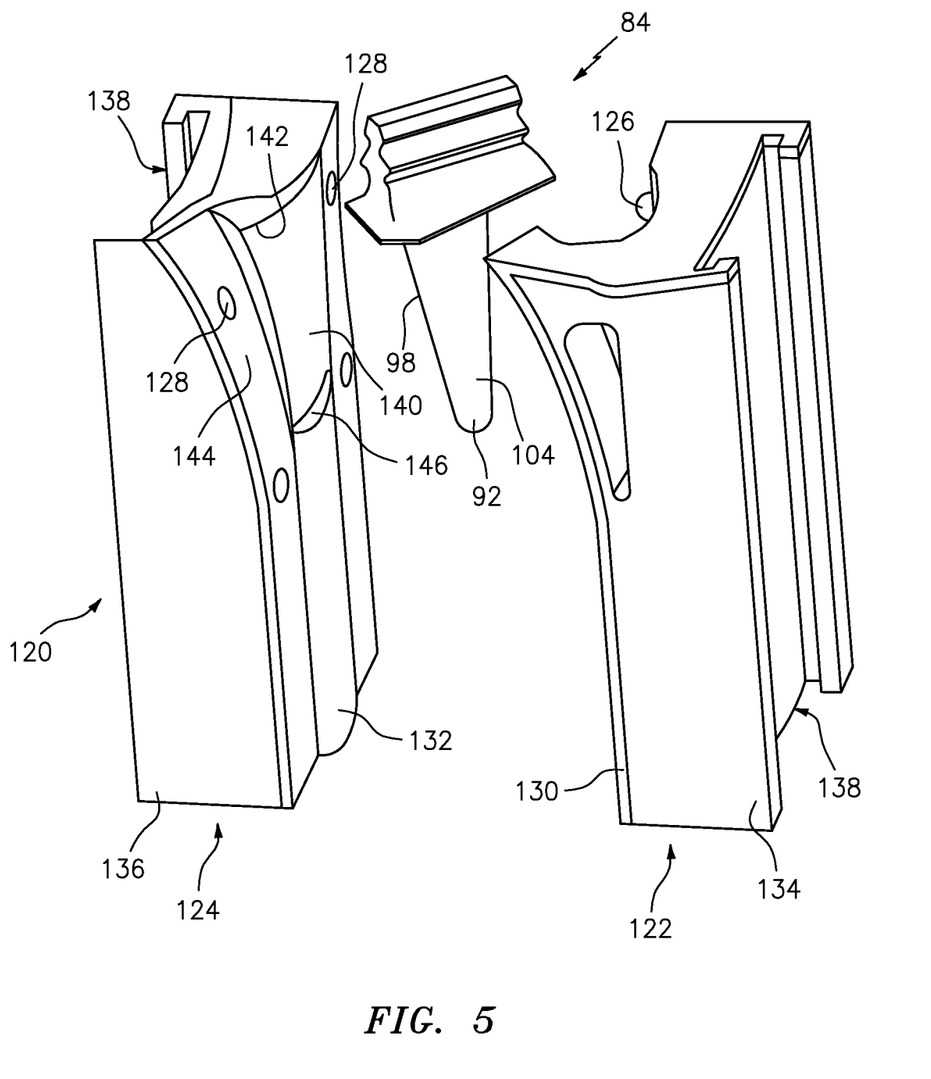
FIG. 5 is an exploded view of an airflow mask tool.

With reference to FIG. 5, an airflow mask tool 120 includes a suction side mask portion 122 to receive a suction side of the airfoil 92 and a pressure side mask portion 124 to receive a pressure side of the airfoil 92. Although the suction side mask portion 122 and the pressure side mask portion 124 are illustrated in this embodiment, various other or additional portions may be utilized to assemble the airflow mask tool 120. The pressure side mask portion 124 is keyed to the suction side mask portion 122 via a multiple of studs 126 (one shown) on the suction side mask portion 122 and corresponding apertures 128 on the pressure side mask portion 124.

The suction side mask portion 122 and the pressure side mask portion 124 are readily manufactured with an additive manufacturing process that includes, but is not limited to, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Laser Powder Bed Fusion (LPBF) and others. Although particular additive manufacturing processes are disclosed, other suitable rapid manufacturing methods using layer-by-layer construction or additive fabrication can alternatively be used. The additively manufactured structure facilitates heretofore unavailable detail to enclose and seal with the associated component.

Figure 6:
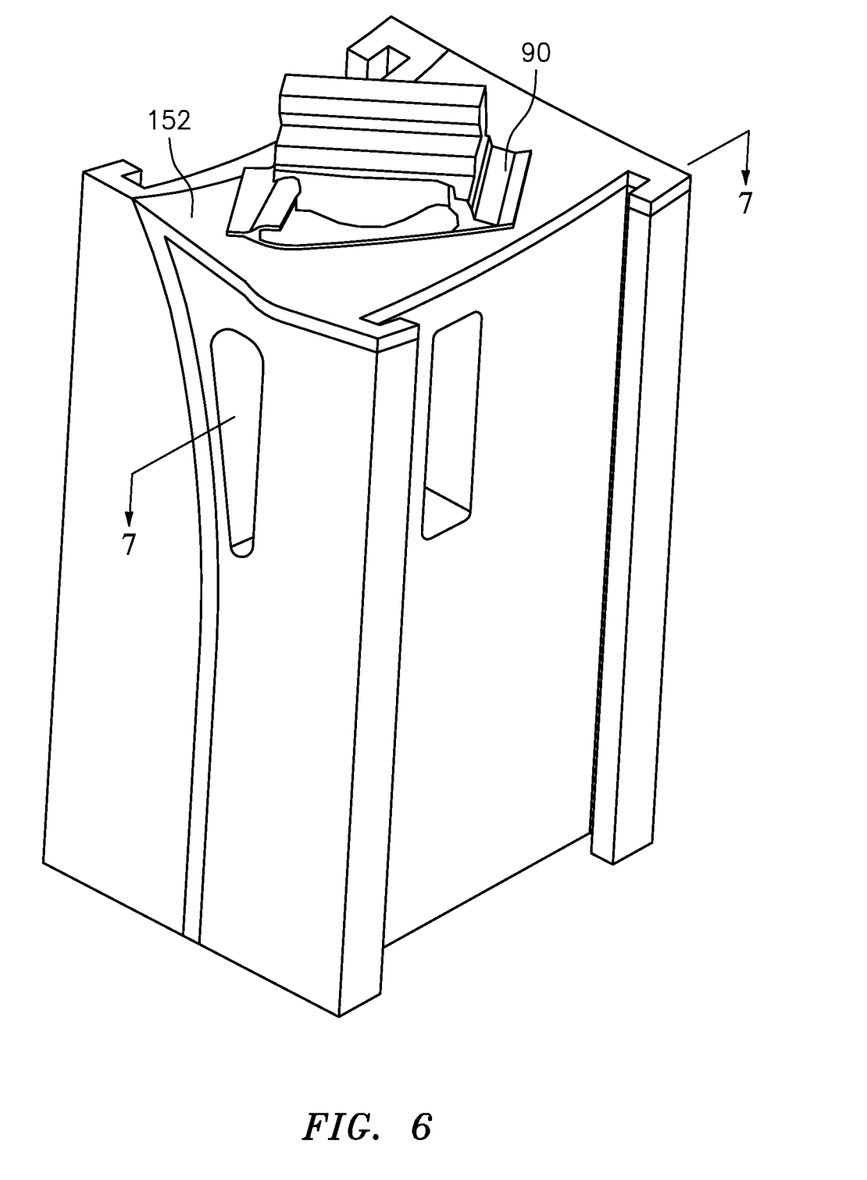
FIG. 6 is a perspective view of the airflow mask tool with the component sealed therein.

The pressure side mask portion 124 and the suction side mask portion 122 are additively manufactured to respectively include a seal surface 130, 132 and a support structure 134, 136. The seal surface 130, 132 is a relatively soft material of Shore 10 A-50 A on the ASTM D2240 type A durometer scale, more specifically about 30 A-40 A, and still more specifically DM9850. The support structure 134, 136 is a relatively hard material of about of Shore 80 A-100 A, more specifically about 90 A, and still more specifically DM8510. The seal surface 130, 132 seals with the airfoil 92 to enclose up to, for example, at least a portion of the platform 90 (FIG. 6). The support structure 134, 136 includes a respective interface 138 that permits the airflow mask tool 120 to be received within a fixture (not shown) to retain the airflow mask tool 120 in an assembled condition while permitting airflow to flow though the airfoil 92. In one example, the airflow is at a pressure of about 1-10 psi and more specifically 5-7 psi.

The seal surface 132 of the pressure side mask portion 124 includes an at least partially arcuate convex portion 140 that is formed to correspond with the first sidewall 102 of the airfoil 92. A leading edge 142 of the partially arcuate convex portion 140 extends from an interface surface 144 of the seal surface 130 that includes the key apertures 128. A ledge 146 is formed to correspond with the tip 96 of the airfoil 92.

Figure 7:
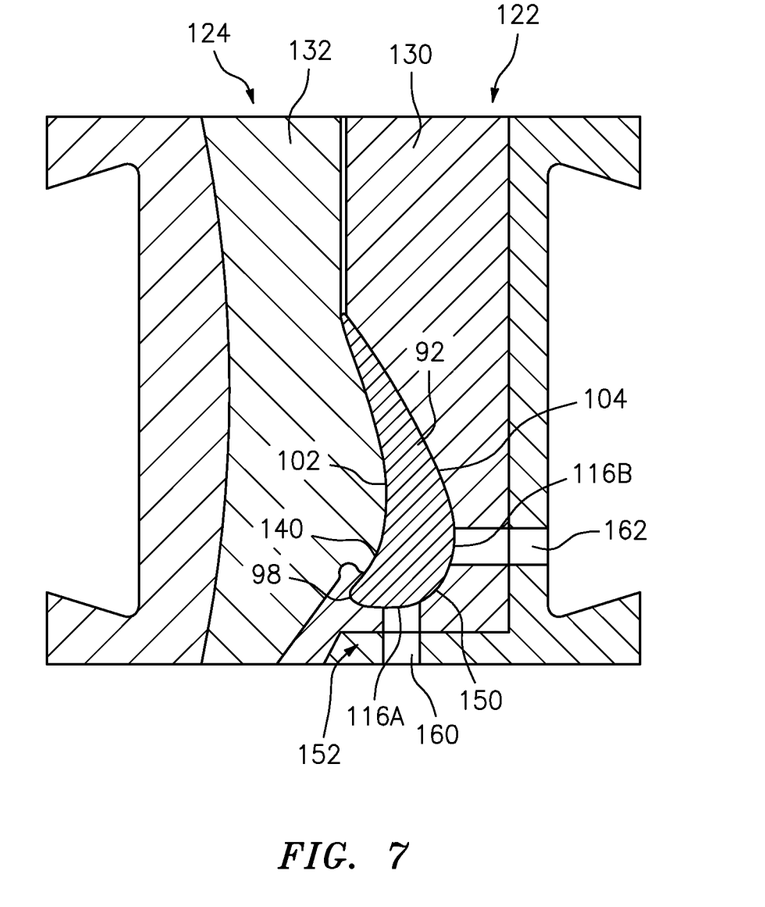
FIG. 7 is a cross-sectional illustration of an example airflow mask tool taken along line 7-7 in FIG. 6.

With reference to FIG. 7, the seal surface 130 of the suction side mask portion 122 includes an at least partially arcuate concave portion 150 that is formed to correspond with the second sidewall 104 of the airfoil 92. The suction side mask portion 122 includes a leading edge section 152 that at least partially wraps around the leading edge 98 of the airfoil 92. That is, the seal surface 132 of the leading edge section 152 curls at least partially abound the leading edge 98 of the airfoil 92 to interface with the leading edge 142 of the partially arcuate convex portion 140. A portion 154 of the support structure 136 extends to form an "L" shape to support the seal surface 132 of the leading edge section 152.

Figure 8:
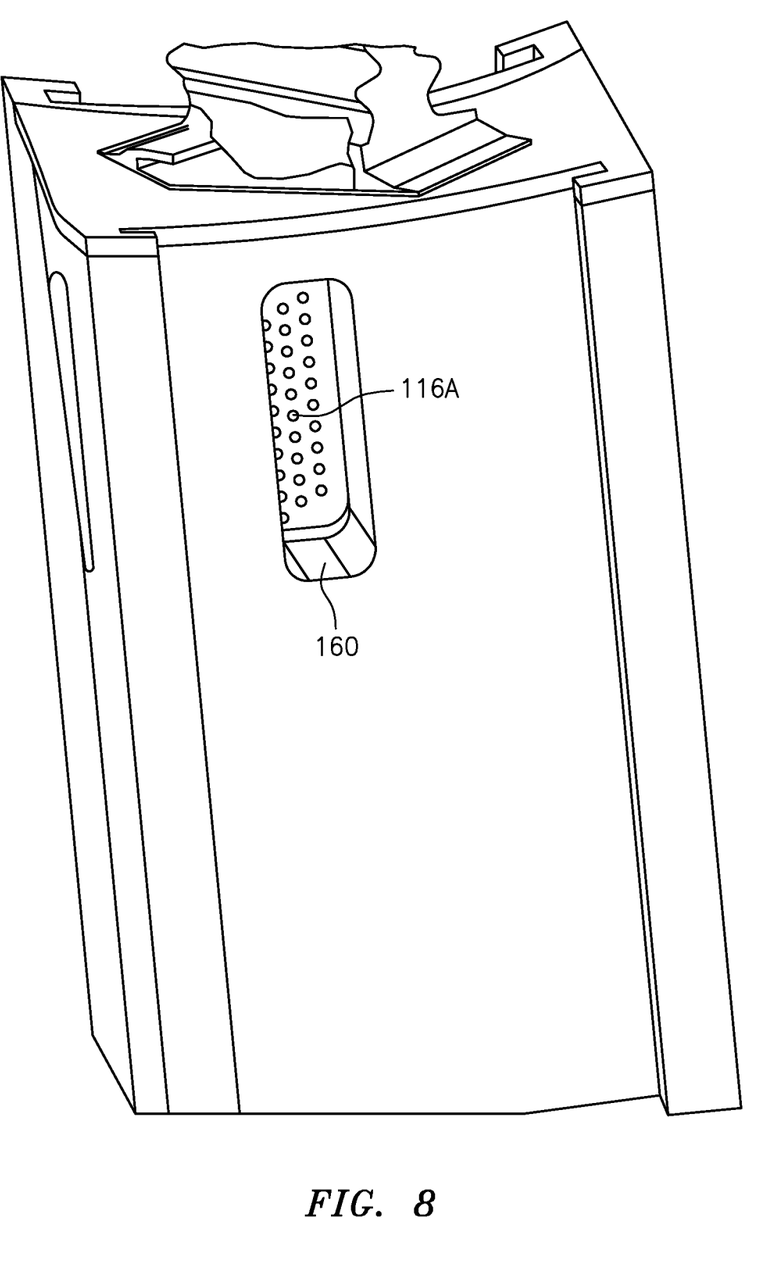
FIG. 8 is a view of the airflow mask tool that shows a fixture interface.
Figure 9:
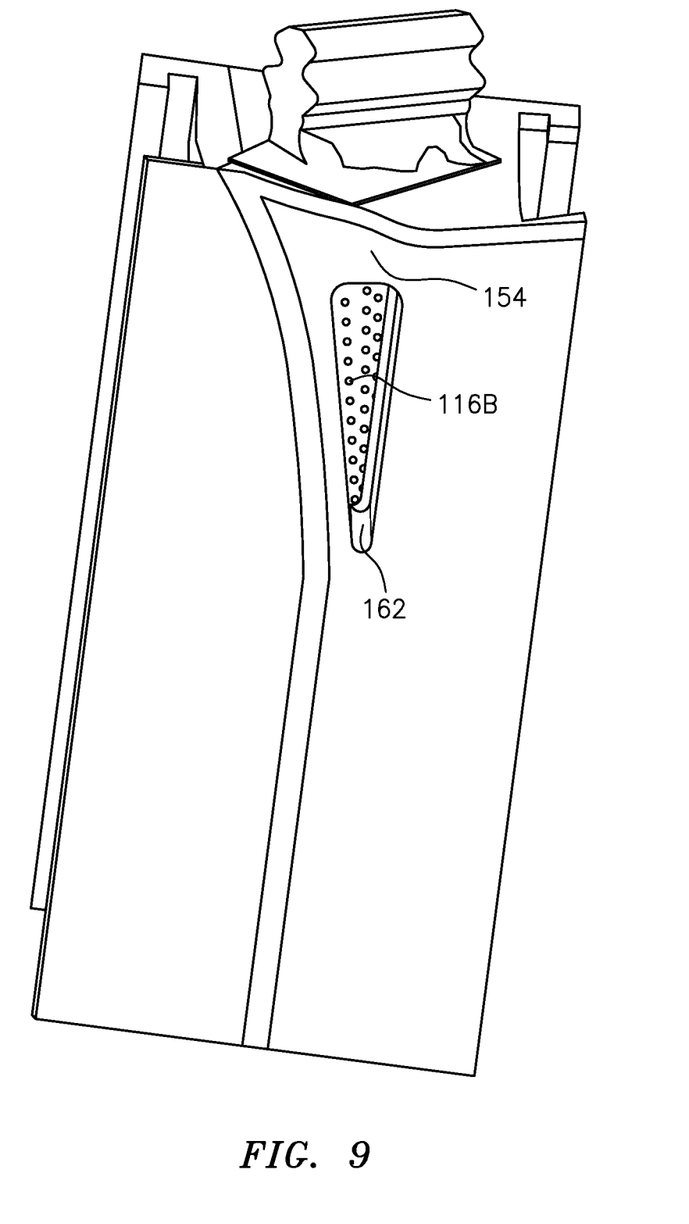
FIG. 9 is a side view of the airflow mask tool.

The suction side mask portion 122 includes, in this example, a first opening 160 (FIG. 8) in the portion 154 of the support structure 136. The first opening 160 is associated with a first set of cooling passage exits 116A in the leading edge 98 of the airfoil 92. A second opening 162 (FIG. 9) is located in the support structure 136 associated with a second set of cooling passage exits 116B in the airfoil 92. The first opening 160 and the second opening 162 permit a predetermined airflow to flow through the airfoil 92 such that the airflow can be measured to assure proper formation. Other suction side mask portions 122 and other pressure side mask portions 124 with additional and/or other openings may be utilized to test other flow paths of the array of internal passageways 110. That is, a different set of suction side mask portions 122 and/or pressure side mask portions 124 may be assembled to the same component to provide other test flow paths.

Figure 10:
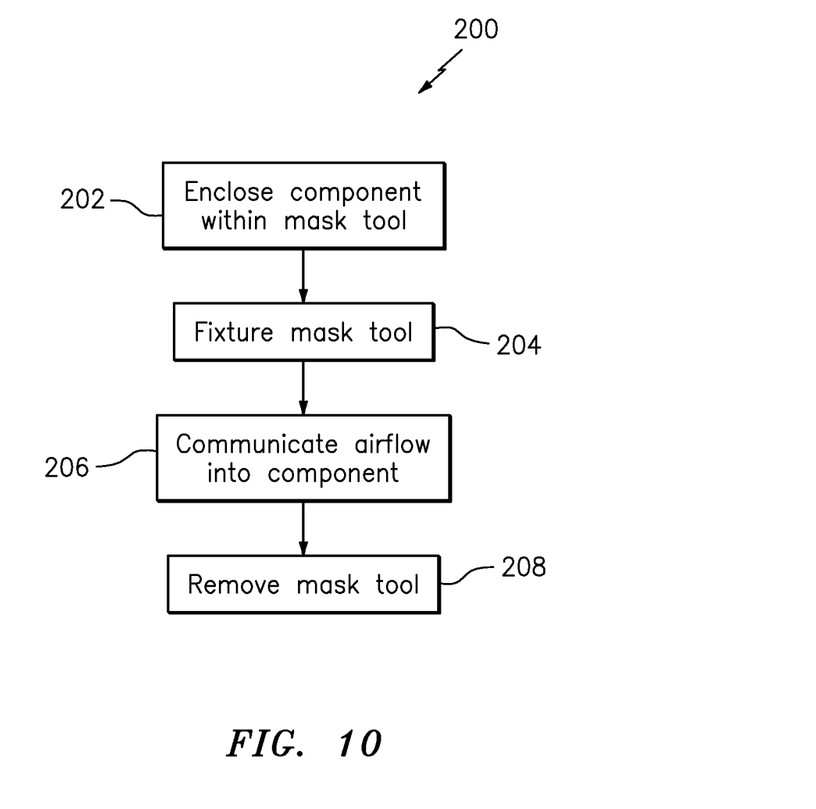
FIG. 10 is a flow chart illustrating a method of airflow testing a portion of an array of internal passageways in the component using on example airflow mask tool.

With reference to FIG. 10, a method 200 for testing the array of internal passageways 110 is illustrated in a schematic block diagram form. It should also be appreciated that application is not limited to aerospace components and various other airflow cooled component applications will benefit herefrom.

Initially, the component is enclosed within the airflow mask tool 120 (step 202). The assembled airflow mask tool 120 is then located in an airflow test fixture (step 204).

Airflow is then communicated into the feed passage 112 to flow through the airfoil 92 then, for example, the first opening 160 and the second opening 162 of the airflow mask tool 120 (step 206). This allows waxing to be replaced by a reusable, durable, additively manufactured structure which eliminates the time added to the airflow process cycle due to masking and unmasking.

Next, once the airflow testing is complete the first airflow mask tool 120 is removed (step 208). Another airflow mask tool 120 may then be used to block different exits which are not a part of the flow which is to be tested. Often upwards of ten airflow tests with 10 different airflow mask tools may be performed on a single component.

The airflow mask tool 120 standardizes the airflow masking. Through this standardization, the operator dependent process of waxing is eliminated, creating a level 1 mistake proof process. This also reduces potential ergonomic issues from manual masking, as well as reduced risk of components escaping to the external customer with masking still on the part. Cost savings are seen in removing manual time. The trend toward components of increasing complexity will only increase the masking/removal time required, due to the number of flows, as well as the complexity of the part structures.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason, the appended claims should be studied to determine true scope and content.

What is claimed is:

1. An airflow mask tool, comprising:
   a pressure side mask portion to seal at least a portion of a pressure side of a component comprising an airfoil having an array of internal passageways, a seal surface of the pressure side mask portion that comprises an at least partially arcuate convex portion that is formed to correspond with a sidewall of an airfoil, the seal surface manufactured of a softer material than a support structure of the pressure side mask portion; and
   a suction side mask portion that fits to the pressure side mask portion to enclose at least a portion of the airfoil, the suction side mask portion seals to at least a portion of a suction side of the airfoil, a seal surface of the suction side mask portion that comprises an at least partially arcuate concave portion that is formed to correspond with a sidewall of the airfoil, the seal surface manufactured of a softer material than a support structure of the suction side mask portion, at least one of the suction side mask portion and the pressure side mask portion comprising at least one opening to expose at least one exit from the array of internal passageways such that airflow communicated into the array of internal passageways exits through the at least one exit from the array of internal passageways while the suction side mask portion is assembled to the pressure side mask portion.

2. The airflow mask tool as recited in claim 1, wherein the pressure side mask portion is keyed to the suction side mask portion via a multiple of apertures and corresponding multiple of studs.

3. The airflow mask tool as recited in claim 1, wherein the pressure side mask portion fits to the suction side mask portion to completely enclose the airfoil.

4. The airflow mask tool as recited in claim 1, wherein the pressure side mask portion fits to the suction side mask portion to completely enclose the airfoil and a portion of a platform of the component.

5. The airflow mask tool as recited in claim 1, wherein the seal surface is of a Shore 10A-50A on the ASTM D2240 type A durometer scale.

6. The airflow mask tool as recited in claim 1, wherein the seal surface of the pressure side mask portion comprises an at least partially arcuate convex portion that is formed to correspond with a sidewall of the airfoil.

7. The airflow mask tool as recited in claim 6, wherein a leading edge of the partially arcuate convex portion is displaced from an interface surface that interfaces with an interface surface of the suction side mask portion.

8. The airflow mask tool as recited in claim 6, wherein the seal surface of the suction side mask portion comprises an at least partially arcuate concave portion that is formed to correspond with a sidewall of the airfoil.

9. The airflow mask tool as recited in claim 8, wherein the seal surface of the suction side mask portion comprises a leading edge section that at least partially wraps around a leading edge of the airfoil.

10. The airflow mask tool as recited in claim 9, wherein a leading edge portion of the support structure extends to support the seal surface of the leading edge section.

11. The airflow mask tool as recited in claim 10, wherein the at least one opening to expose the at least one exit from the array of internal passageways is located adjacent to the leading edge of the airfoil.

12. The airflow mask tool as recited in claim 10, wherein the at least one opening to expose the at least one exit from the array of internal passageways is located on a suction side of the airfoil.

13. The airflow mask tool as recited in claim 1, wherein the pressure side mask portion and the suction side mask portion are additively manufactured.

14. The airflow mask tool as recited in claim 1, wherein the seal surface of the pressure side mask portion comprises an at least partially arcuate convex portion that is formed to correspond with the first sidewall of the airfoil.

15. The airflow mask tool as recited in claim 14, wherein a leading edge of the partially arcuate convex portion extends from an interface surface of the seal surface.

16. The airflow mask tool as recited in claim 1, wherein the suction side mask portion comprises a leading edge section that at least partially wraps around a leading edge of the airfoil.

17. The airflow mask tool as recited in claim 1, wherein the suction side mask portion comprises a leading edge section that curls at least partially abound a leading edge of the airfoil to interface with the leading edge of the partially arcuate convex portion.

18. The airflow mask tool as recited in claim 17, wherein a portion of the support structure extends to form an "L" shape to support the seal surface of the leading edge section.

19. A method of testing a portion of an array of internal passageways in a component, comprising:
enclosing an airfoil of a component having an array of internal passageways within a pressure side mask portion and a suction side mask portion to expose at least one exit from the array of internal passageways;
sealing the pressure side mask portion and the suction side mask portion to the airfoil of the component via a seal surface softer than a support surface to seal all exits other than the at least one exit from the array of internal passageways;
communicating airflow into the array of internal passageways such that the airflow exits through at least one exit from the array of internal passageways through one of the pressure side mask portion and the suction side mask portion while the pressure side mask portion is assembled to the suction side mask portion; and
nondestructively removing the pressure side mask portion and the suction side mask portion subsequent to communicating the airflow.

20. The method as recited in claim 19, wherein enclosing the airfoil comprises keying the pressure side mask portion to the suction side mask portion to facilitating assembly.

21. The method as recited in claim 19, wherein enclosing the airfoil comprises sealing the pressure side mask portion and the suction side mask portion to the airfoil of the component to seal all exits other than the at least one exit from the array of internal passageways to permit communicating airflow into the array of internal passageways such that the airflow exits through at least one exit from the array of internal passageways through one of the pressure side mask portion and the suction side mask portion while the pressure side mask portion is assembled to the suction side mask portion.

22. The method as recited in claim 19, wherein enclosing the airfoil comprises sealing the pressure side mask portion and the suction side mask portion to the airfoil of the component to seal all exits other than the at least one exit from the array of internal passageways to permit communicating airflow into the array of internal passageways such that the airflow exits through at least one exit from the array of internal passageways through one of the pressure side mask portion and the suction side mask portion while the pressure side mask portion is assembled to the suction side mask portion, the pressure side mask portion and the suction side mask portion additively manufactured.

* * * * *